United States Patent
Dermark

(10) Patent No.: US 7,436,684 B2
(45) Date of Patent: Oct. 14, 2008

(54) DC/DC-RECTIFIER WITH REDUCED LOSSES

(75) Inventor: Daniel Dermark, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 10/559,706

(22) PCT Filed: Jun. 11, 2003

(86) PCT No.: PCT/SE03/00962

§ 371 (c)(1), (2), (4) Date: Dec. 7, 2005

(87) PCT Pub. No.: WO2004/109898

PCT Pub. Date: Dec. 16, 2004

(65) Prior Publication Data

US 2006/0256596 A1    Nov. 16, 2006

(51) Int. Cl.
*H02M 3/335* (2006.01)
*H02M 7/219* (2006.01)
*H02M 7/5387* (2007.01)

(52) U.S. Cl. .................. 363/17; 363/127; 363/132

(58) Field of Classification Search .................. 363/17, 363/127, 132, 125, 84, 81
See application file for complete search history.

(56) References Cited

U.S. PATENT DOCUMENTS

| | | | |
|---|---|---|---|
| 4,953,068 A * | 8/1990 | Henze | 363/17 |
| 5,027,264 A * | 6/1991 | DeDoncker et al. | 363/16 |
| 6,424,548 B2 * | 7/2002 | Pascu et al. | 363/78 |
| 6,426,884 B1 * | 7/2002 | Sun | 363/17 |
| 6,452,815 B1 * | 9/2002 | Zhu et al. | 363/17 |
| 6,937,483 B2 * | 8/2005 | Zhu et al. | 363/17 |
| 7,099,161 B2 * | 8/2006 | Yan et al. | 363/17 |
| 2001/0030879 A1 * | 10/2001 | Greenfeld et al. | 363/17 |

FOREIGN PATENT DOCUMENTS

| | | |
|---|---|---|
| EP | 1 069 675 A1 | 1/2001 |
| JP | 6-311743 | 11/1994 |

OTHER PUBLICATIONS

Office Action issued in Chinese Application No. 038266164 and translation.

* cited by examiner

*Primary Examiner*—Jeffrey L. Sterrett
*Assistant Examiner*—Harry Behm
(74) *Attorney, Agent, or Firm*—Nixon & Vanderhye P.C.

(57) ABSTRACT

A DC/DC-rectifier includes a transformer and a primary side bridge. The primary side bridge comprises a first pair of switches and a second pair of switches, and a secondary side bridge also comprises a first pair of switches and a second pair of switches. The switching of the first pair of switches on the primary side is linked to the switching of the first pair of switches on the secondary side. The linking is accomplished by switching off the first pair on the secondary side when the first pair on the primary side is switched on, and conversely, when the first pair on the primary side is switched off.

2 Claims, 2 Drawing Sheets

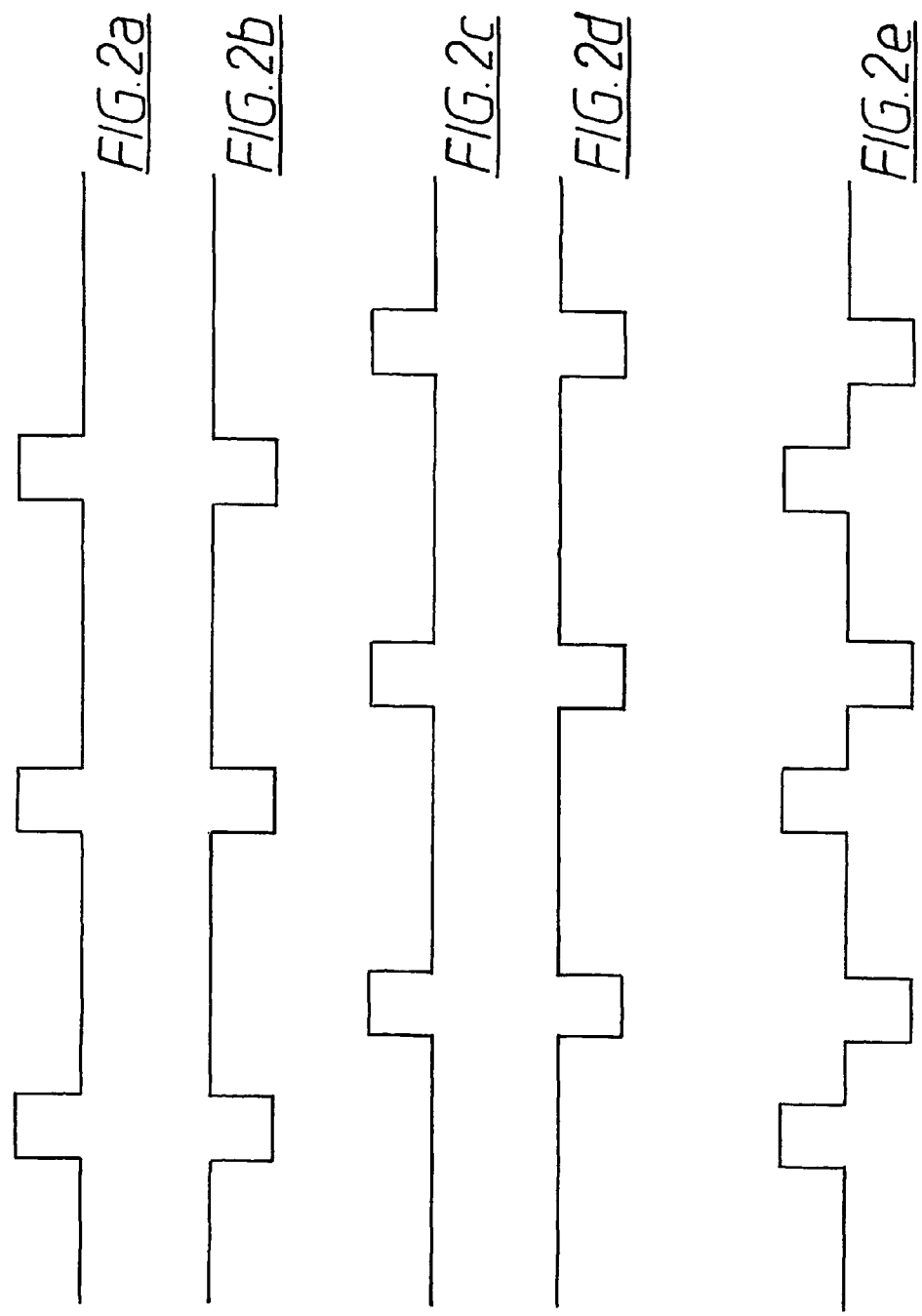

DC/DC-RECTIFIER WITH REDUCED LOSSES

This application is the U.S. national phase of international application PCT/SE2003/000962, filed 11 Jun. 2003, which designated the U.S., the entire content of which is hereby incorporated by reference.

TECHNICAL FIELD

The present invention relates to a DC/DC-rectifier, comprising a transformer and primary and secondary side bridges. The rectifier according to the invention exhibits, inter alia, improved efficiency and reduced losses as compared to previously known rectifiers.

BACKGROUND

Rectifiers, i.e. devices which convert an electrical voltage of one level to an electrical voltage of another level are well known in the art, and usually involve a transformer, and a set of components on either side of the transformer, the two sides commonly being known as the primary (input) and secondary (output) side. Rectifiers which convert a first DC-voltage level to a second DC-voltage level are also well known, and usually involve a set of switches on the primary and secondary sides, in order to make it possible to use a transformer with DC-voltages. In conventional such devices, a pair of switches on the primary side is linked to a pair of switches on the secondary side, so that the linked pairs of switches on either side of the transformer are turned on and off simultaneously, often with the same control signal or control voltage.

A well known problem in DC/DC-rectifiers is the efficiency of the device, and thus also the losses, the desire naturally being for as high an efficiency as possible, and as low losses as possible.

In DC/DC-rectifiers, there is a phenomenon known as "freewheeling", which occurs during periods when the switches on the primary side are turned off, and the current on the secondary side circulates "freely" on the device's secondary side trough the load R.

One source of losses, and thus of heat development in the device, comes form the fact that current passes through the transformer on the secondary during the freewheeling period. Another source of losses is switching losses in the primary and secondary side switches.

SUMMARY

There is thus a need for a DC/DC-rectifier with decreased freewheeling losses and heat development. The need is met by providing a method for use in a DC/DC-rectifier. The rectifier comprises a transformer and a bridge on the primary side of the transformer, where the primary side bridge comprises a first pair of switches and a second pair of switches, and, on the secondary side of the transformer, a secondary side bridge comprising a first pair of switches and a second pair of switches.

The method comprises linking on/off-switching of the first pair of switches on the primary side to the on/off-switching of the first pair of switches on the secondary side, with the linking of the on/off-switching of the first pair of switches on the primary side to the on/off-switching of a first pair of switches on the secondary side being carried out by switching off the first pair on the secondary side when the first pair on the primary side is switched on, and conversely, when the first pair on the primary side is switched off.

Suitably but not necessarily, the method additionally comprises linking on/off-switching of the second pair of switches on the primary side to on/off-switching of the second pair of switches on the secondary side, with the linking of the on/off-switching of the second pair of switches on the primary side to the on/off-switching of the first pair of switches on the secondary side being carried out by switching off the second pair on the secondary side when the second pair on the primary side is switched on, and conversely, when the second pair on the primary side is switched off.

Having the switches on the secondary side of the transformer be in an "on-state" most of the time cuts down switching losses on the secondary side and significantly reduces the freewheeling losses. The reduction of freewheeling losses comes in part from the fact that the freewheeling current will not have to pass through the transformer, since at least one pair of switches will always be in an on-state when the freewheeling occurs, thus offering a path for the current.

BRIEF DESCRIPTION OF THE DRAWINGS

FIG. 2 is a timing diagram of voltage pulses used for controlling switches in a device.

DETAILED DESCRIPTION

Figure 1:
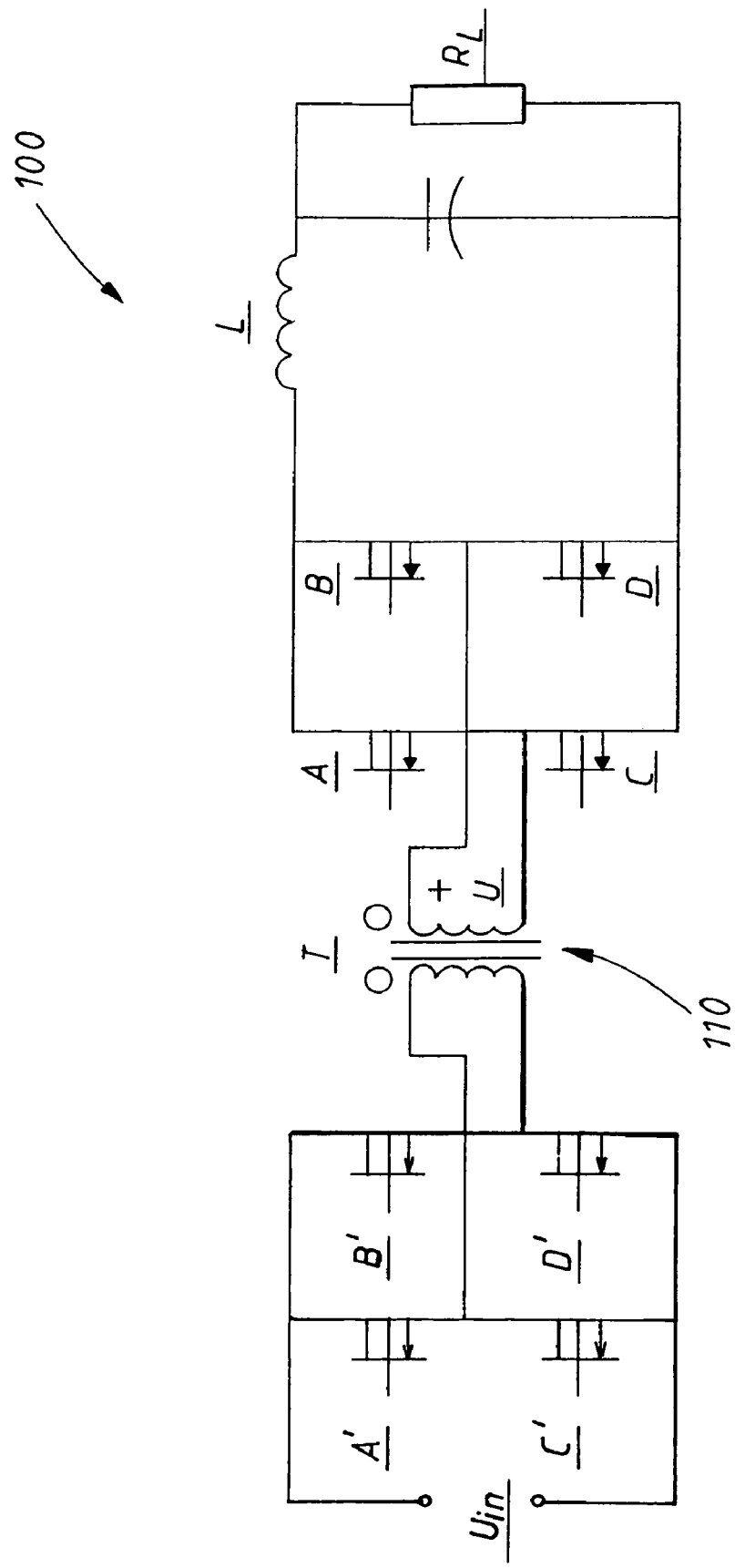
FIG. 1 is a circuit diagram showing the secondary side of a device.

FIG. 1 shows a circuit diagram of a device 100 to which the invention can be applied. The device 100 comprises a transformer 110 and, on the secondary side of the transformer 110, a first pair of switches A, D, and a second pair of switches B, C. As can be seen, the device is designed so that it comprises two parallel "lines," each line comprising a switch from each of said pair. As can also be seen from FIG. 1, the transformer is connected to the secondary side in such a way that one end of the transformer 110 is connected to a point in the first "line" between the two switches, and the other end of the transformer 110 is connected to a point in the second line, between the two switches in that line.

Suitably but not necessarily, the switches used in the device 100 are FET:s, i.e. field effect transistors.

In addition, the device 100 comprises an inductance, L, on the secondary side, and there is a load, R, supplied by the device on the secondary side, with the load being connected in parallel to said two lines. The inductance, L, is connected in series between the two lines and the load. In addition, the device also comprises a capacitance, C, in parallel with the load R.

On the primary side of the transformer 110, there is also a first and a second pair of switches, (A', D') and (B', C') also being connected a manner similar to the connection of the switches on the secondary side, i.e. two parallel lines with two switches in each, each line comprising a switch from each of said pair.

On the primary side as well, one end of the transformer 110 is connected to a point in the first "line" between the two switches, and the other end of the transformer 110 is connected to a point in the second line, between the two switches in that line.

Using not shown control means, there is a linkage between a first pair of switches (FET:s in the example shown) on the primary side and a first pair on the secondary side, as well as between a second pair of switches on the primary side and a second pair on the secondary side. The linkage is in the form of linking the on/off-switching of linked pairs of transistors on the primary and secondary side respectively to each other.

Thus, if the switches A and D on the secondary side are referred to as the first pair on the secondary side, a corresponding first pair of switches A', D', on the primary side will have their on/off switching linked to the on/off-switching of A and D, and in a similar manner for the switches B, C, on the secondary side with a corresponding second pair B', C', on the primary side.

The linkage is often such that the same voltage pulses or pulse trains are applied to the linked pairs. Conventionally, the linkage has been such that linked pairs of switches are switched on or off simultaneously, i.e. in the example of FIG. 1, the switch pairs A, D-A', D' and B', C'-B, C respectively would be switched on and off simultaneously.

While the principle described above works well with respect to the rectification function of the device 100, it has a number of drawbacks: first of all, the frequent on/off switching on the secondary side will lead to so called switching losses.

In addition, there is something known as the freewheeling cycle, which is the period of time when neither of the switch pairs on the primary side is on. During the freewheeling cycle, there will be energy left in the system, which will need "to go somewhere". In a rectifier according to the prior art, this power will lead to a current passing through the transformer windings, leading to losses and a corresponding heat build-up.

The switching losses on the secondary side are virtually eliminated, and the freewheeling losses are kept to a minimum, using the following. The same voltage pulse train is applied to linked pairs of switches, but the voltage train is inverted when it is applied to the switches on the secondary side, as opposed to the switches on the primary side. If, for example, switches A', D', on the primary side are switched on, the signal which caused them to switch on, is inverted and will cause the linked switch pair A, D, on the secondary side to switch off, and conversely when the switches A', D', on the primary side are caused to switch off.

The technology described above will become easier to understand if reference is made to FIG. 2, which is a timing diagram of the control voltages and pulse trains.

FIG. 2a is an illustration of the voltage applied to the first pair of switches on the primary side, i.e. the switches A', D'. High voltage indicates that the switches are on, and low voltage indicates that the switches are off. The switching of the switches is controlled by not shown control means, which is true for the switching for all of the switches in the device. As can be seen, the switches are turned off for longer periods of time than they are switched on, the importance of which will become apparent later in this description.

FIG. 2b is an illustration of the control voltage applied to the first pair of switches on the secondary side, i.e. the switches A and D. As can be seen, the control voltage applied to A and D is the inverse of the control voltage applied to the linked pair of switches on the primary side, A' D', which thus will lead to the first pair of switches on the secondary side being turned off when the first pair on the primary side is turned on, and conversely when the pair on the primary side is turned off.

FIGS. 2c and 2d are illustrations of the control voltages applied to the second pair of switches on the primary (2c) and secondary (2d) side. As can be seen, the principle of "opposite states" (on/off) described in connection with FIGS. 2a and 2b is true for the second pairs of switches as well.

One of the important can now be understood with reference to FIGS. 2b and 2d. At least one pair of switches on the secondary side will always be in the "on" state. This means that there will be no switching losses on the secondary side, since there is always at least one pair of transistors which can conduct current.

In addition, the fact that at least one pair of transistors on the secondary side will always conduct current causes the virtual elimination of the freewheeling losses, since the transistor pair which is on will offer an alternative current path to the freewheeling current, as opposed to passing through the transformer's windings.

The inversion of the control voltage to the switches on the primary side is carried out by well known inverting means, which will not be described in more depth here.

Because the linked pairs of transistors on either side are thus not turned on simultaneously, the "normal" state of the switches on the secondary side is thus the opposite of the linked switches on the primary side, in the example shown the "on" state. When a pair of switches on the primary side is turned on, the corresponding pair on the secondary side is turned off, causing that pair not to conduct current. Accordingly, a DC/DC-rectifier is obtained which is simple to design and inexpensive to produce, yet has virtually no switching losses and low freewheeling losses.

Finally, it should be pointed out that the switches on the primary side of the bridge can be configured in a large number of different ways. For example, as can be seen in FIG. 2e, a large number of types of bridges on the primary side of the transformer may be used. FIG. 2e shows the voltage U over the transformer, and as can be seen, the state of the switches on the secondary state is on when the voltage U over the transformer is zero or close to zero.

The invention claimed is:

1. A method for use in a DC/DC-rectifier, said rectifier comprising a transformer and a bridge on the primary side of the transformer, the primary side bridge comprising a first pair of switches and a second pair of switches, and, on the secondary side of the transformer, a secondary side bridge comprising a first pair of switches and a second pair of switches, said method comprising:

linking on/off-switching of the first pair of switches on the primary side to the on/off-switching of the first pair of switches on the secondary side by switching off the first pair on the secondary side when the first pair on the primary side is switched on, and when the first pair on the primary side is switched off, switching on the first pair on the secondary side, and linking on/off-switching of the second pair of switches on the primary side to on/off-switching of the second pair of switches on the secondary side by switching off the second pair on the secondary side when the second pair on the primary side is switched on, and when the second pair on the primary side is switched off, switching on the second pair on the secondary side, wherein the first and second pairs of switches on the primary side are turned off for longer periods of time than they are switched on, and wherein the on/off switching of the pairs of switches is carried out by applying individual control voltage pulse trains to each pair of switches, and wherein the control voltage pulse train which is applied to the pair of switches on the secondary side is the inverse of the control voltage pulse train applied to the pair of switches on the primary side to which it is linked.

2. A DC/DC-rectifier, comprising:
a transformer;
a primary side bridge on the primary side of the transformer including a first pair of switches and a second pair of switches, and a secondary side bridge on the secondary side of the transformer including a first pair of switches and a second pair of switches, means for linking on/off-switching of the first pair of switches on the primary side to the on/off-switching of the first pair of switches on the secondary side by switching off the first pair on the secondary side when the first pair on the primary side is switched on, and when the first pair on the primary side is switched off, switching on the first pair on the secondary side, and means for linking the on/off- switching of the second pair of switches on the primary side to on/off- switching of the second pair of switches on the secondary side by switching off the second pair on the secondary side when the second pair on the primary side is switched on, and conversely, when the second pair on the primary side is switched off, wherein switches on the primary side are turned off for longer periods of time than they are switched on, and wherein the on/off switching of the pairs of switches is carried out by means for applying individual control voltage pulse trains to each pair of switches, and wherein the control voltage pulse train which is applied to the pair of switches on the secondary side is the inverse of the control voltage pulse train applied to the pair of switches on the primary side to which it is linked.

* * * * *